Nov. 2, 1926. 1,605,820
W. R. EDWARDS
BOX OR CONTAINER FOR ELECTRICAL ACCUMULATORS
Filed April 3, 1925
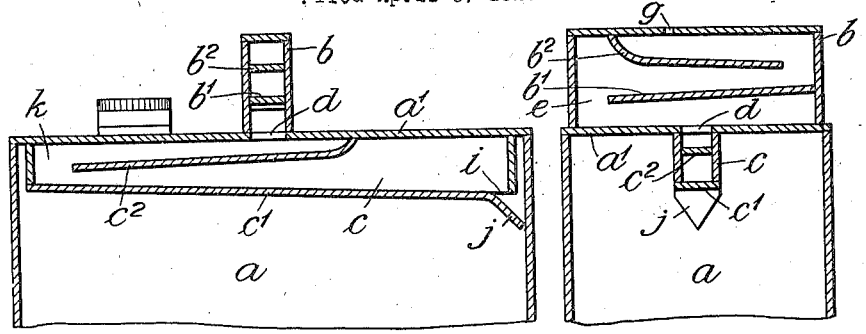
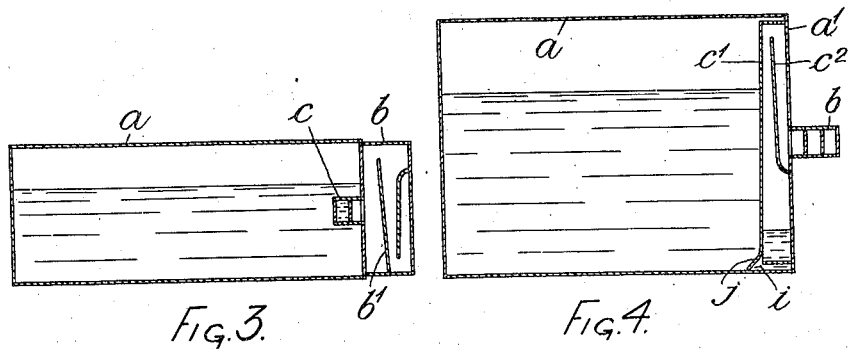
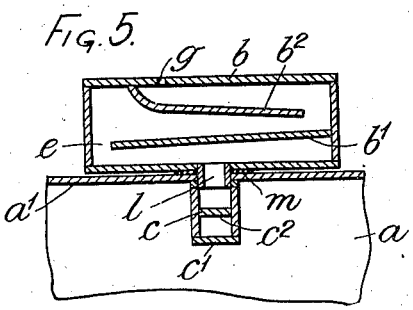
Inventor
W. R. Edwards
by Wilkinson & Giusta
Attorneys.

Patented Nov. 2, 1926.

1,605,820

UNITED STATES PATENT OFFICE.

WILLIAM ROWLAND EDWARDS, OF LONDON, ENGLAND, ASSIGNOR TO ROWLAND EDWARDS AND COMPANY, LIMITED, OF LONDON, ENGLAND, A BRITISH COMPANY.

BOX OR CONTAINER FOR ELECTRICAL ACCUMULATORS.

Application filed April 3, 1925, Serial No. 20,536, and in Great Britain May 22, 1924.

This invention has for its object to provide an improved non-spilling box or container for electrical accumulators, the improved construction being of the type wherein the box or container is fitted with non-spilling and venting devices consisting of chambers provided with baffle plates adapted to prevent the escape of acid should the box be upset.

According to the present invention I fit across the top of the accumulator box, above or beneath the cover thereof, a venting chamber or case provided with a number of superposed oppositely inclined baffle or drainage plates having a passage way at their lowest ends, the inlet from the accumulator being located beneath the lowermost baffle or drainage plate at its highest end and the outlet arranged above the uppermost baffle or drainage plate preferably towards its highest end.

If desired a second venting chamber or case with baffles arranged on the same principle may be fitted at right angles to the first one.

Where only one venting chamber is employed, and to prevent the accumulator box from lying on its ends, the said ends may be rounded or fitted with suitable projections.

By the improved venting device the acid is prevented from escaping when the box is upset and also the escape of wet acid fumes is prevented as the moisture is extracted from the vapour by contact with the baffle or drainage plates before it reaches the vent.

The accompanying drawings illustrate some constructions carried out in accordance with the present invention.

Figs. 1 and 2 are respectively longitudinal and transverse sections through the top of an accumulator box made in accordance with the present invention.

Figs. 3 and 4 are sectional views of the accumulator box showing the approximate position of the liquid contents when the accumulator box is laid on its side and end respectively.

Fig. 5 is a similar view to Fig. 2 showing one way of fitting the invention to an existing accumulator box.

In the construction shown in Figs. 1 to 4, I fit across the top of the cover $a'$ of the box $a$ a venting chamber in the form of a small case $b$ extending across or nearly across the box $a$ and of suitable dimensions, and within the cover $a'$ I fit a second venting chamber or case $c$ arranged at right angles to the outer case $b$.

In manufacture the bottom of the case $b$ may be made open and then attached to the cover $a'$ over a venting aperture or hole $d$ therein.

In the said venting chambers or cases $b$ and $c$ I arrange a number of superposed drainage plates, say two, for example, as shown in case $b$ the first and lowest drainage plate $b'$ is inclined downwardly and extends nearly to the end of the case leaving a small space or passage way between it and the end of the case.

The vent opening $d$ from the box $a$ is located under the centre of the first and lower drainage plate $b'$.

The next drainage plate $b^2$ is arranged with its higher end above and near the opening or passage way $e$ in the lower drainage plate $b'$.

The top of the venting chamber or case $b$ is covered in and provided with a small vent hole $g$ for the eventual escape of gas or vapour.

In the case $c$ the bottom $c'$ of the case is inclined downwardly to the one end where an opening $i$ leading into the box is provided, the end of the said sloping base $c'$ being preferably finished off in the form of a tapered tongue $j$ the end of which makes contact with the side wall of the box, and thereby facilitates the draining away of any accumulated liquid.

$c^2$ is an intermediate inclined drainage plate leading from beyond the opening $d$ into the base $b$ down to an opening $k$ above the uppermost end of the inclined base $c'$.

In the construction shown apart from the superposed drainage plates in the respective venting chamber or cases $c$ and $b$, the said chambers are only connected by the intermediate passage $d$ in the top of the box.

In use the acid fumes passing from the accumulator box into the venting chamber will impinge on the bottoms of the respective drainage plates and any moisture collected will run downwards and through the respective connecting openings and finally will run off the lower end of the inclined base c' back into the box, the tongue j facilitating this operation.

The acid fumes partly freed from moisture by contact with the drainage surfaces of the lower venting chamber c will pass through the hole d into the upper venting chamber b where the drainage plates b' b² will ensure the further removal of any condensed moisture which will run back through the hole d. The acid fumes will finally escape practically free from moisture through the outer vent g in the top of the outer venting case b.

In this way the accumulation of acid or moisture on the top of the accumulator as is commonly the case will be avoided.

It will also be seen that as the venting chambers and drainage plates extend across or nearly across the width and length of the box by reason of the two venting chambers b and c being placed at right angles the one to the other, these drainage plates will not allow the acid to escape if the box is laid upon its side or end as the acid will not reach to the then highest edge of the drainage plates.

This will be seen more clearly by reference to Figs. 3 and 4, which show that when the box is laid upon its side or end the liquid contents only penetrate partly into the chamber c owing to the tendency to the creation of a partial vacuum in the space above the acid end by the fact that the entry of air is prevented by the construction and arrangement of the venting chambers and the drainage plates therein.

As shown in Fig. 5 the improved venting chambers b and c may be applied to an existing accumulator by making the said venting chambers b and c as separate units and mounting them one in the inside and the other on the outside of the cover a' of the accumulator box which will be removed for the purpose.

The said venting chambers b and c will be connected by a short tube l, a suitable washer m being interposed if required. The separate venting chambers may be secured in place by solvent or in any suitable manner.

What I claim as my invention and desire to secure by Letters Patent is:—

1. In accumulator boxes of the type referred to a venting device consisting of two communicating chambers provided with zigzag venting and drainage channels, the said chambers being arranged at right angles to one another at the top of the accumulator box.

2. In accumulator boxes of the type referred to a venting device consisting of a chamber provided with zigzag venting and drainage channels, the base of the said venting chamber which opens into the accumulator box being inclined downwardly and fitted at its lower end with a projecting tongue touching the side of the accumulator box.

3. In an accumulator box of the type referred to a venting device consisting of at least one chamber provided with zigzag venting and drainage channels, the base of said venting device which opens into the accumulator box being inclined downwardly and fitted at its lower end with a projecting tongue touching the side of the accumulator box.

4. For accumulator boxes a venting device consisting of zigzag venting and drainage channels, the drainage surfaces of which are sloped downwardly, the portion of the said channels next the inlet being arranged at right angles to the portion next the outlet.

WILLIAM ROWLAND EDWARDS.